United States Patent [19]

Morgan

[11] 4,122,070

[45] Oct. 24, 1978

[54] FIBERS AND ANISOTROPIC MELTS OF POLYAZOMETHINES

[75] Inventor: Paul Winthrop Morgan, West Chester, Pa.

[73] Assignee: E. I. Du Pont de Nemours and Company, Wilmington, Del.

[21] Appl. No.: 806,517

[22] Filed: Jun. 14, 1977

Related U.S. Application Data

[60] Division of Ser. No. 667,431, Mar. 19, 1976, Pat. No. 4,048,148, which is a continuation-in-part of Ser. No. 576,236, May 9, 1975, abandoned.

[51] Int. Cl.$^2$ .................... C08L 61/02; C08L 61/20
[52] U.S. Cl. .................... 528/149; 528/229; 264/342 R; 528/245; 528/266; 528/220; 528/244; 528/270; 528/127
[58] Field of Search .............. 260/72.5, 67 R, 65, 260/63 N

[56] References Cited

U.S. PATENT DOCUMENTS

| | | | |
|---|---|---|---|
| T918,005 | 1/1974 | Baker et al. | 260/72.5 |
| 3,198,767 | 8/1965 | Matsuda et al. | 260/65 |
| 3,418,281 | 12/1968 | Smith et al. | 260/72.5 |
| 3,493,522 | 2/1970 | Webb | 260/72.5 |
| 3,493,524 | 2/1970 | Webb | 260/72.5 |
| 3,516,970 | 6/1970 | Webb | 260/72.5 |
| 3,516,971 | 6/1970 | Webb | 260/72.5 |
| 3,526,611 | 9/1970 | Webb | 260/72.5 |
| 3,751,467 | 8/1973 | Dietrich et al. | 260/566 |
| 3,819,587 | 6/1974 | Kwolek | 260/78 |

FOREIGN PATENT DOCUMENTS 1,080,526  8/1967  United Kingdom.

OTHER PUBLICATIONS

J. Poly. Sci. Part A-1, vol. 5, 1659–1669 (1967), Dyer et al.

J. Poly Sci. Part CN. 29, pp. 37–46 (1970), Hodgkin et al.

Encyclopedia of Polymer Science & Technology (1969), vol. 10, pp. 659–670. G. F. D'Alelio.

J. Macromol. Sci. (Chem.) A-1(1)147–178, (1967), Delman et al.

*Primary Examiner*—John C. Bleutge

[57] ABSTRACT

High strength fibers and films are prepared from melt extrudable (co)polyazomethines.

4 Claims, 1 Drawing Figure

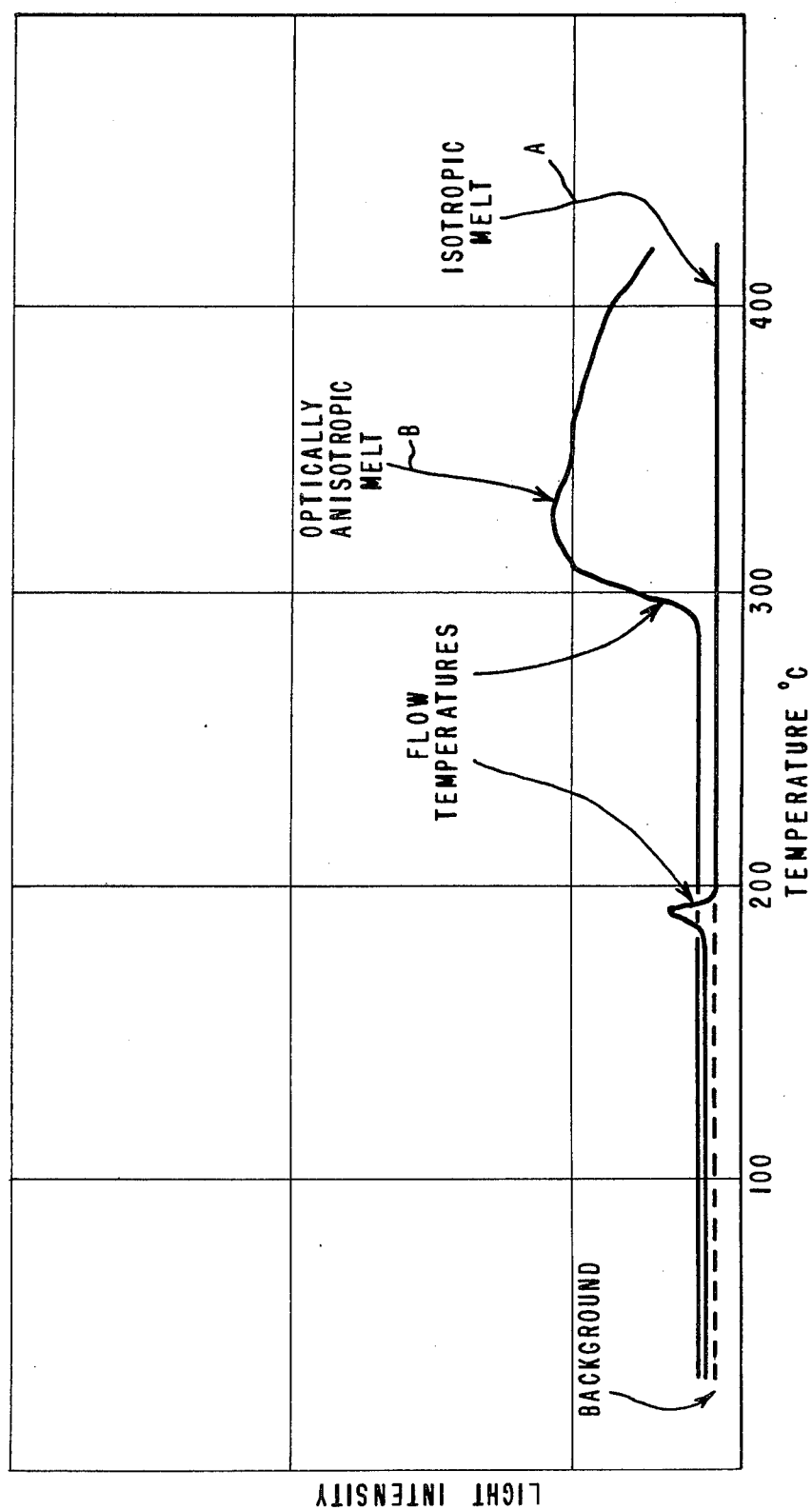

FIBERS AND ANISOTROPIC MELTS OF POLYAZOMETHINES

COPENDING RELATED APPLICATION

This application is a divisional of my application Ser. No. 667,431, filed Mar. 19, 1976 now U.S. Pat. No. 4,048,148, which is a continuation-in-part of my application Ser. No. 576,236, filed May 9, 1975 and now abandoned.

BACKGROUND OF THE INVENTION

Optical anisotropy is known in the art for dopes (or solutions) of synthetic polyamides, e.g., the dopes of Kwolek U.S. Pat. No. 3,671,542. Liquid crystal behavior is reported in the art for polyolefin melts.

Polyazomethines [or poly(Schiff bases)] are extensively described in the literature [e.g., in "Encyclopedia of Polymer Science and Technology", Vol. 10, 659-670 (1960), Interscience Publishers, New York, G. F. D'Alelio] and in the patent art, e.g., in U.S. Pat. Nos. 3,526,611 and 3,418,281.

Polyazomethines that can be molded at high temperature and at high pressure have been disclosed in U.S. Pat. No. 3,418,281 and British Patent No. 1,080,526. The polymers are said to have good thermal stability and toughness. Films of polyazomethines that have been cast from dilute solutions or that have been pressed at high temperatures and at high pressures are disclosed in Baker et al. T 918005, Jan. 1, 1974 Official Gazette (Defensive Publication). However, none of this prior art suggests that certain aromatic polyazomethines can form anisotropic melts which can be melt spun directly into filaments.

SUMMARY OF THE INVENTION

This invention provides novel melt spinnable aromatic and cycloaliphatic polyazomethines and copolyazomethines having polymer melt temperatures below 375° C., inherent viscosities of at least 0.2, and which display optical anisotropy in the molten state. Also provided are novel useful oriented fibers spun from these polymers without need for afterdrawing. Many of the as-spun fibers show increased orientation and tenacity and frequently modulus when heated in an essentially relaxed or in a taut condition at temperatures above 100° C. and below their melting point. Other shaped articles such as films and bars may be prepared from the polymers.

DRAWINGS

The FIGURE depicts light intensity traces obtained as described herein for two different polyazomethines in the solid and melt states along with the background trace. One of the trace curves (B) is of a polymer of the invention while the other trace curve (A) is of a polymer which yields an isotropic melt.

DESCRIPTION OF THE PREFERRED EMBODIMENTS

Polyazomethines and Copolyazomethines

The polyazomethines and copolyazomethines of the invention consist essentially of recurring structural units selected from the group

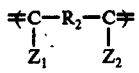  (I)

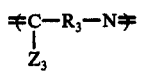  (II)

and

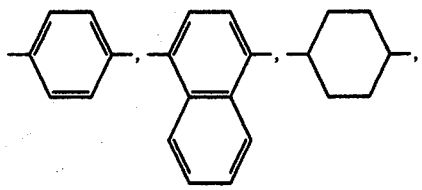  (III)

wherein units I and II, if present, are present in substantially equimolar amounts; $Z_1$, $Z_2$, and $Z_3$ which may be the same or different, are selected from the group of a hydrogen atom or a methyl or ethyl radical; and $R_1$, $R_2$, and $R_3$ are radicals selected from the group of 1) single and fused 6-membered carbocyclic ring systems in which one of the ring carbons of an aromatic ring, if present, may be replaced by nitrogen and wherein the chain extending bonds of the ring system if attached to a single ring, are positioned 1,4- to each other, and if attached to different rings, are in positions parallel and oppositely directed, and 2) multiple ring, preferably carbocyclic ring, systems in which the individual rings are joined by a chemical bond or a bridging unit not exceeding fourteen, preferably not exceeding four, atoms in length and in which the chain extending bonds of each ring are in the 1,4-positions and $R_1$ may be chemical bond.

Illustrative of 1) are

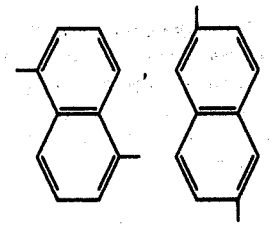

and of 2) are

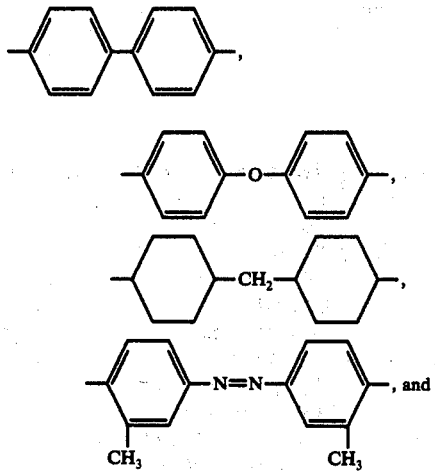

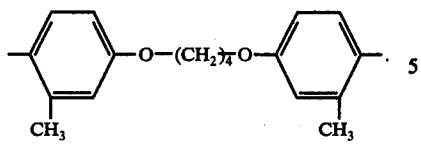

The foregoing ring systems are also intended to include one or more substituents such as lower alkyl (1–4 carbons) and chloro- on the ring.

Also included in the invention are those (co)-polyazomethines wherein up to 40 mol % and preferably up to 25 mol % based on the total I, II and III units are replaced by polyazomethine forming unit(s) not conforming to those previously described and which do not interfere with the anisotropic melt forming capability of the polymers. A non-limiting list of these units includes

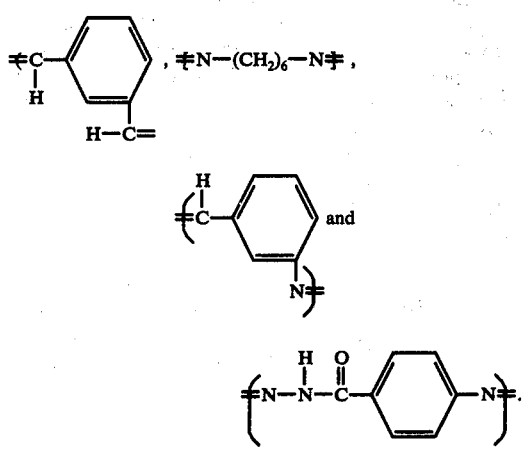

The (co)polyazomethines, as mentioned above, may comprise units I and II in substantially equimolar amounts or may comprise units III or may comprise a combination of units I, II, and III and, of course, more than one kind of unit (I, II, or III) can be present in the polymer, e.g.,

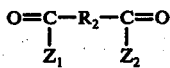

units.

Preferred (co)polyazomethines of the invention consist essentially of units I and II. In such polymers, it is preferred that $R_1$ is selected from the group of chloro-, bromo-, methoxy, fluoro-, methyl-, hydroxy- and nitro- 1,4-phenylene; 4,4'-biphenylene; 3,3'-dimethyl-4,4'-biphenylene, 1,4-phenylene; 4,4'-methylenediphenylene; 4,4'-dimethylenediphenylene; 4,4'-trimethylenediphenylene; 4,4'-tetramethylenediphenylene; 2,6-naphthylene; 1,5-naphthylene; 2,6-dichloro-1,4-phenylene; trans-1,4-cyclohexylene; trans-2-methyl-1,4-cyclohexylene; trans-4,4'-methylenedicyclohexylene; 3,3'-dimethyl-4,4'-tetramethylenedioxydiphenylene; 4,4'-azoxydiphenylene; 3,3'-dimethyl-4,4'-azodiphenylene; and a bond; and $R_2$ is selected from the group of 1,4-phenylene; chloro-1,4-phenylene; methyl-1,4-phenylene; 4,4'-biphenylene; 4,4'-oxydiphenylene; 4,4'-ethylenediphenylene; 4,4'-methylenediphenylene; 4,4'-ethylenedioxydiphenylene; 2,5-pyridinediyl; 1,5-naphthylene; 2,6-naphthylene; 1,4-naphthylene; 2,5-dichloro-1,4-phenylene; 2,5-dibromo-1,4-phenylene; 2,5-dimethoxy-1,4-phenylene; 2-bromo-1,4-phenylene; 2-methoxy-1,4-phenylene; and 2-hydroxy-1,4-phenylene radicals. More preferably, at least 25% of the total number of ring systems in such units I and II are ring-substituted with a member of the group consisting of chloro- and methyl radicals because of good processability and/or stability coupled with processability.

Where units III are present exclusively or with units I and II, it is preferred that $R_3$ be selected from the group of 1,4-phenylene; methyl-1,4-phenylene; 4,4'-oxydiphenylene; 2,6-naphthylene; 1,5-naphthylene; and chloro-1,4-phenylene.

Where the polymer consists essentially of III units, or a combination of I, II, and III units, it is preferred that at least 25% of the ring systems in the total number of such units be ring-substituted with a member of the group consisting of chloro- and methyl radicals.

Preferred polymers are those prepared from (1) methyl-1,4-phenylenediamine and terephthalaldehyde because of good processability and since fibers thereof are particularly high in tenacity; (2) methyl-1,4-phenylenediamine, 1-4-phenylenediamine and terephthalaldehyde and (3) bis(4-aminophenyl)ethane and chloroterephthalaldehyde because of obtaining highly crystalline fibers with good hydrolytic stability.

The (co)polyazomethines of the invention should form anisotropic melts and melt at temperatures below 375° C., preferably below 350° C., to provide processibility into fibers and other shaped articles. Depending on structure, rapid decomposition of the (co)polyazomethines occurs at higher temperatures. The melts are believed to comprise domains of parallel aligned polymer chains which in the spinning process produce as-spun oriented fibers.

The (co)polyazomethines of the invention are melt spinnable. By "melt spinnable" is meant a polymer that can be melt spun and is able to remain in the molten state for the time required to spin filaments. Other (co)polyazomethines are infusible. Still others appear to soften or flow momentarily at an elevated temperature and then to harden into an infusible material. This is believed to be due to further rapid polymerization. The melt spinnable polymers of the invention can remain molten for at least 5 minutes.

The (co)polyazomethines of the present invention are prepared by reacting a diamine of the formula $H_2N-R_1-NH_2$ with a dialdehyde or diketone of the formula $$O=C-R_2-C=O$$
$$\quad\;\; | \qquad\quad\; |$$
$$\;\;\;\;\; Z_1 \qquad\;\; Z_2$$

and/or an aminoaldehyde or aminoketone of the formula

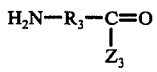

or functionally equivalent derivatives of any such reactants and wherein $R_1$, $R_2$, and $R_3$ are radicals selected from the group of 1) single and fused 6-membered carbocyclic ring systems in which one of the ring carbons of an aromatic ring, if present, may be replaced by nitrogen and wherein the chain extending bonds of the ring system if attached to a single ring are positioned 1,4-to each other, and if attached to different rings, are in positions parallel and oppositely directed, and 2) multiple ring, preferably carbocyclic ring, systems in which the individual rings are joined by a chemical bond or a bridging unit not exceeding fourteen, preferably not exceeding four, atoms in length and in which the chain extending bonds of each ring are in the 1,4-positions and $R_1$ may be a chemical bond and $Z_1$, $Z_2$, and $Z_3$ are selected from the group of a hydrogen atom or a methyl or ethyl radical.

Diamines useful for preparing the polymers of the invention correspond to the formula $H_2N-R_1-NH_2$ wherein $R_1$ is as defined above. These include 1,4-phenylenediamine, chloro-1,4-phenylenediamine, bromo-1,4-phenylenediamine, fluoro-1,4-phenylenediamine, methyl-1,4-phenylenediamine, methoxy-1,4-phenylenediamine, nitro-1,4-phenylenediamine, 2,6-dichloro-1,4-phenylenediamine, 4,4'-diaminobiphenyl, 3,3'-dimethyl-4,4'-diaminobiphenyl, bis(4-aminophenyl)ethane, 1,3-bis(4-aminophenyl)propane, 1,4-bis(4-aminophenyl)butane, 2,6-naphthalenediamine, trans-1,4-cyclohexanediamine, 2-methyl-trans-1,4-cyclohexanediamine; bis(trans-4-aminocyclohexyl) methane, hydrazine, and the like. The diamines may be employed in salt form (e.g., as the dihydrochloride salt), using a neutralizing agent in the reaction, e.g., lithium carbonate.

Dialdehydes and diketones useful for preparing the polymers of the invention correspond to the formula

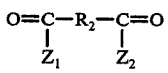

where $R_2$ and $Z_1$ and $Z_2$ are as defined above. These include 1,4-diacetylbenzene; 4,4'-diacetylbiphenyl; terephthalaldehyde, chloroterephthalaldehyde; methyl-terephthalaldehyde; 2,5-diformylpyridine; 4,4'-diformylbiphenyl; 2,6-diformylnaphthalene; 1,5-diformylnaphthalene, 1,4-diformylnaphthalene; bis(4-formylphenyl)methane; bis(4-formylphenyl)ethane; bis(4-formylphenyl)ether; 1,2-bis(4-formylphenoxy)ethane; 2,5-dichloroterephthalaldehyde; 2,5-dibromoterephthalaldehyde; 2,5-dimethoxyterephthalaldehyde; 2-bromoterephthalaldehyde; 2-methoxyterephthalaldehyde; 2-hydroxyterephthalaldehyde and the like.

Aminoaldehydes and aminoketones useful in preparing the polymers of this invention correspond to the formula

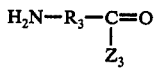

wherein $Z_3$ and $R_3$ have the previously given significance. These include 4-amino-3-chlorobenzaldehyde; 4-amino-3-fluorobenzaldehyde; 4-amino-3-methylbenzaldehyde; 4-amino-3-chloroacetophenone; 4-amino-3-fluroacetophenone; and 4-amino-3-methylacetophenone and the like.

It should be understood that not all combinations of reactants will produce the anisotropic melts. Combinations of reactants producing polymers with melting points in excess of 375° C. should be avoided, as such high melting products are difficult to process (e.g., spin into useful fibers).

Polymers from some combinations of reactants appear to soften momentarily and then further polymerize to a non-melting solid, without anisotropy being observed. Such polymers are outside the scope of the present invention. They have limited utility since they cannot be melt spun. However, if in the course of preparing such polymers, an end-capping or chain terminating agent is employed, the product obtained is an end-capped polymer that does exhibit anisotropy in the melt. The present invention encompasses only the anisotropic melt forming (co)polyazomethines regardless of whether or not the polymers are end-capped by addition of an end-capping agent during polymerization.

The (co)polymers of the invention have a molecular weight sufficient for them to exhibit fiber-forming properties. Some of the (co)polymers may be insoluble in the solvent used for measuring inherent viscosity. Good fibers and films are obtained from these (co)polymers as well as from those with inherent viscosities of at least 0.2, and preferably at least 1.0, all measured as described hereinafter.

The polymer melting point is to some extent dependent on the inherent viscosity, that is, a polymer with low inherent viscosity generally melts at a lower temperature than the same polymer having a higher inherent viscosity.

Polymerization Conditions

The polyazomethines and copolyazomethines may be prepared from appropriate monomers by thermal polymerization techniques, preferably under anhydrous conditions in an inert atmosphere. For example, equimolar amounts of the reactant diamine and dialdehyde (or a derivative, such as a diacetal) are combined in a reaction vessel. The contents of the vessel are stirred and heated while they are maintained under nitrogen. As the reactants polymerize, the by-product (e.g., water or alcohol) is removed. When the polymerization has proceeded to a desired point, the polymer may be removed and purified. Optionally, if molten, the polymer may be transferred directly to an appropriate apparatus for preparation of shaped articles, e.g., a fiber spinning unit.

The reactants may be dissolved in a solvent (e.g., benzene) which forms an azeotrope with the byproduct and which assists in by-product removal. After the polymerization has been completed, preceipitated product is filtered off; to isolate a soluble product, the remaining solvent may be evaporated.

The (co)polymers may also be prepared by low temperature solution polymerization techniques, using polar solvents. In one convenient method the diamine(s) is dissolved in a polar amide solvent selected from the group of, e.g., N,N-dimethylacetamide (DMAc), N-methylpyrrolidone-2 (NMP), hexamethylphosphoramide (HMPA), or mixtures thereof, each containing lithium chloride. The dialdehyde(s) is added and the reaction mixture stirred. The reaction is allowed to proceed for from several hours to several days. The reaction mixture is then combined with a non-solvent (e.g., water), collected, washed thoroughly (e.g., water, ether, methanol) and dried prior to subsequent processing.

To assist in subsequent processing, an end-capping or chain terminating agent is advantageously employed in these polymerizations. Useful agents include aniline, 4-carboxybenzaldehyde, 4-aminoacetanilide, 4-amino-3-methylbenzoic acid, benzaldehyde, and benzoyl chloride. Although the benzoyl chloride has been successfully employed, mineral acid-producing agents (which may degrade the polymer) generally should be avoided. These terminating agents assist in controlling or minimizing molecular weight increases in the polymers during melt spinning. For example, if too high a molecular weight develops due to further polymerization during spinning, the spinning operation may yield low quality fibers or may be interrupted. Since some chain-length growth during heat treatment in fiber form is desirable, chain-termination which completely inhibits further polymerization should be avoided.

If desired, the end-capping may be achieved without the introduction of a foreign agent. For example, one may employ an excess of one reactant (above stoichiometric amount), and providing a closed system or other mechanism is used to prevent rapid loss of the excess reactant, it will act as an end-capper. This technique is known with other polymers as described in "Fibres from Synthetic Polymers" — R. Hill, Elsevier Publishing Co., Amsterdam, 1953 (pp. 106,107). A thermally stable antioxidant added to the reaction mixture can assist subsequent processing.

Anisotropic Melts

The anisotropy of these polyazomethines and copolyazomethines in the molten state facilitates attainment of high orientation, strength, and initial modulus of fibers prepared from the melts, and also contributes to the capacity of some of these fibers to increase in tenacity on heat treatment in an essentially relaxed state or while taut.

Optical anisotropy of the (co)polyazomethine melts can be determined by known procedures with slight modification. It is well known that translucent optically anisotropic materials cause light to be transmitted in optical systems equipped with crossed polarizers [see, e.g., S. A. Jabarin and R. S. Stein, J. Phys., Chem., 77, 399 (1973)], whereas transmission of light is theoretically zero for isotropic materials. The instant anisotropic melts behave in the former manner. The thermo-optical test (TOT) described below uses this feature to identify these melts. The apparatus is similar to that described by I. Kirshenbaum, R. B. Isaacson, and W. C. Feist, Polymer Letters, 2, 897–901 (1964).

Shaped Article Preparation

The (co)polyazomethines of this invention are formed into useful shaped articles such as fibers, films, bars, or other molded objects, etc. by, e.g., pressing or by spinning, casting, or extruding the anisotropic melts thereof. A skilled artisan can readily determine the optimum processing temperature within the anisotropic melt range for each species to obtain the desired properties in a shaped article. Care should be taken to avoid thermal decomposition or formation of an isotropic melt (i.e., by heating to excessively high temperatures).

The highly oriented, strong fibers of the invention are prepared from the aforementioned (co)polyazomethines. For fiber preparation the molten polymer mass, obtained either directly from the melt polymerization of the (co)polymer-forming ingredients or via the melting of a plug or block of (co)polymer, is processed, e.g., through a melt spinning unit and extruded through a spinneret into a quenching atmosphere (e.g., air maintained at room temperature) and wound up. As used herein, the term "as-spun fiber" refers to a fiber which has not been drawn, stretched, or annealed after extrusion and normal windup. In fact, "as-spun" fibers of the anisotropic melts cannot be drawn in the usual sense, i.e., 100% or more.

Fibers may be prepared conveniently from single or multi-hole spinnerets. In the melt spinning cell, the temperatures to be maintained in the melt zone and at the spinneret will vary, of course, depending on the polymer being spun. Heat is preferably applied at the spinneret and in a short melt zone above the spinneret. This keeps the inherent viscosity value down and makes spinning easier. Filtering screens and discs may be employed in the spinneret pack. Air or nitrogen may be used as a quenching medium for the fibers leaving the spinneret. The as-spun fibers may be wound up at varying speeds (WUS), e.g., from less than 90 m/min to 1200 m/min or higher. Spin stretch factor varies with spinneret hole size, extrusion rate, and windup speed and generally exceeds 5. If desired, a finish may be applied to the as-spun fibers.

Films may be prepared by conventional melt-pressing techniques and molded or extruded objects, such as bars, may be prepared by conventional means.

Fibers, Films, Bars: Properties, Heat Treatment, Utility

The as-spun fibers of this invention are highly oriented, e.g., as shown by the low values of their X-ray orientation angles of less than about 45°. In addition, they exhibit desirable levels of tensile and other properties. For example, many as-spun fibers are characterized by a tenacity of at least about 4 gpd, and an initial modulus in excess of 400 gpd (and often exceeding 500 gpd).

The fibers of the invention are useful in fiber-reinforced plastics and other industrial applications.

In some of these applications, the fibers are exposed to basic media or to elevated temperatures. For example, reinforced resins are sometimes cured with basic catalysts, rubber compounding materials generally contain organic amines and curing often involves high temperatures exposure for significant time periods. The fibers of the invention are generally resistant to such adverse conditions. Good strength retention has been found in the fibers after exposure to morpholine, sodium hydroxide, rubber or heat ageing.

As-spun fibers of this invention may be subjected to heat treatment processes to provide the heat treated fibers of this invention characterized by, e.g., very high levels of tensile properties, which makes them useful for tire reinforcement. Surprisingly, heat treatment of the fibers in an essentially relaxed, e.g., in skeins or on soft covered (Fiber-Frax ®) bobbins or in a taut state, e.g., on a hard bobbin, at temperatures above 100° C. and below the fiber melting temperature (but preferably to within 20° C. of the melting temperature) usually results in an increase in inherent viscosity indicative of higher molecular weight. The fibers which increase in inherent viscosity upon heat treatment are found to have increased in tenacity. The temperature and period of heat treatment is thus selected to achieve the increase in inherent viscosity. Heating temperatures should preferably be maintained below that temperature at which substantial interfilament fusion occurs. For practical purposes, heating will be carried out for as short a period as possible consistent with obtaining increased tenacity. Depending on the polymer, heating periods from as little as 5 seconds, generally at least ½ hour to 24 hours or longer, have been used. Ordinarily, heating in excess of 8 hours produces little further improvement. The heat treatment should be conducted in an inert environment, one that does not adversely affect the fiber. Nitrogen is quite suitable for this purpose. Fibers having a tenacity of at least 10 gpd are preferred and the heat treatment of many as-spun fibers of the invention will provide this level of tenacity. An increase in orientation as measured by X-ray orientation angle is also noted in the heat treated fibers. The preferred heat treated fibers of the invention have a modulus of at least 150 gpd, an elongation greater than 2%, an orientation angle below 45° and will not melt below 175° C. and preferably not below 250° C.

MEASUREMENTS AND TESTS

X-ray Orientation Angle

The X-ray orientation angle (O.A.) values reported herein are obtained by the procedures described in Kwolek U.S. Pat. No. 3,671,542, using Method Two of that patent.

Inherent Viscosity

Inherent viscosity ($\eta inh$) is defined by the following equation:

$$\eta inh = \ln(\eta rel)/C$$

wherein ($\eta rel$) represents the relative viscosity and C represents a concentration of 0.5 grams of the polymer in 100 ml of solvent. The relative viscosity ($\eta rel$) is determined by dividing the flow time in a capillary viscometer of the dilute solution of the polymer by the flow time for the pure solvent. The dilute solutions used herein for determining ($\eta rel$) are of the concentration expressed by (C) above, unless otherwise indicated; flow times are determined at 30° C.; the solvent is concentrated sulfuric acid (98% $H_2SO_4$); other solvents (e.g., methanesulfonic acid) may be used if degradation occurs in sulfuric acid.

The polymer sample (or fiber), 98% sulfuric acid, and an equal volume of 3 mm Teflon ® cubes, are combined in a closed bottle and placed on a shaking machine for the minimum time to form a solution, usually 10 to 25 minutes. A Cannon-Fenske viscometer is filled by inversion technique and placed in a constant temperature bath consisting of a saturated water solution of potassium dichromate. Three consecutive flow times are measured immediately. The shaking operation is conducted in the dark and all transfer steps are done quickly in subdued light. If solution flow time decreases with successive measurements, the longest time is used for the calculation of $\eta inh$.

Fiber Tensile Properties

Filament and yarn properties are measured by the procedure shown in Morgan U.S. Pat. No. 3,827,998. At least 3 breaks are averaged.

It should be noted that different values are obtained from single filaments (filament properties) and from multifilament strands (yarn properties) of the same sample. Unless specified otherwise all properties given herein are filament properties.

Optical Anisotropy

Optical anisotropy may be measured by the TOT method described herein.

TOT AND FLOW TEMPERATURE APPARATUS AND METHOD

The thermo-optical test (TOT) requires a polarizing microscope which should have strain-free optics and sufficiently high extinction with crossed (90°) polarizers to be capable of giving a background transmission specified below. A Leitz Dialux-Pol microscope was used for the determination reported herein. It was equipped with Polaroid polarizers, binocular eyepieces, and a heating stage. A photodetector (a photometer sensor) was attached at the top of the microscope barrel. The microscope had a 32×, long working distance objective, and a Red I (a first order Red) plate (used only when making visual observations with crossed polarizers; inserted at an angle of 45° to each polarizer). White light from an incandescent light source is directed through the polarizer, through the sample on the heating stage and through the analyzer to either the photodetector or the eyepieces. A slider permits transferring the image from eyepieces to photodetector. The heating stage used is one capable of being heated to 500° C. A "Unitron" model MHS vacuum heating stage (Unitron Instrument Co., 66 Needham St., Newton Highlands, Massachusetts 02161)was used. The photodetector signal is amplified by a photometer amplifier and fed to the Y-axis of an X-Y recorder. The system response to light intensity should be linear and the precision of measurement within ± 1 mm on the chart paper. The heating stage is provided with two attached thermocouples. One is connected to the X-axis of the X-Y recorder to record stage temperature, the other to a programmed temperature controller. The microscope is focused visually (with crossed polarizers) on a polymer sample prepared and mounted as described below. The sample, but not the cover slips, is removed from the optical path. The Polaroid analyzer of the microscope is removed from the optical path, the slider is shifted to transfer the image to the photodetector and the system is adjusted so that full-scale deflection (18 cm on the chart paper used) on the Y-axis of the X-Y recorder corresponds to 36% of the photometer signal. This is done by (1) adjusting the light source intensity so that the photometer reads a value preselected so that it corresponds to a Y-axis reading on the recorder of 5 cm; (2) increasing the amplification of the photometer by a factor of 10. This results in the full scale recorder deflection of 18 cm corresponding to (18/50) × 100 or 36% of the photometer signal. The background transmission value is recorded with crossed (90°) polarizers and with the cover slips, but not the sample, in the optical path. The background transmission in the system used should be independent of temperature and should be less than about 0.5 cm on the chart paper.

Duplicate samples for the thermo-optical test and flow temperature determination, respectively, are prepared as follows. A few particles of pure polymer are placed between cover slips and observed visually on the heating stage between crossed (90°) polarizers while the stage is heated at a programmed rate of about 50°

C./min. The sample temperature (T) at which the edges of the particle(s) become rounded, indicative of flow, is noted. Duplicate samples, each consisting of particles of polymer between cover slips, are placed between two microscope slides. This assembly is placed on a hot plate which has been preheated to (T + 10° C.) as measured by a thermocouple inserted into a steel plate resting on a portion of the hot plate. As the assembly is heated to higher temperatures, pressure is applied alternately over each sample with a wooden tamp until the particles coalesce and flow into two thin, liquid films. The assembly is removed promptly, cooled, and the solid films (maintained between cover slips) are separated from the assembly. Since the polymer sample may readily polymerize further during this procedure, it is important that heating time and temperature in the sample preparation for this procedure be kept to a minimum.

The polymer film specimen preferably should be 4 to 6 $\mu$m (micrometers) thick. Films that are too thick or too thin may fail to exhibit anisotropy by this test. However, if a specimen does exhibit anisotropy, there is no need to repeat the test on a sample within the 4 to 6 micrometer range. Specimen thickness may be estimated interferometrically. This is conveniently done indirectly by infiltrating an oil of known refractive index between the cover slips enclosing the specimen and measuring the thickness of the oil layer at an interface with air in the region adjacent to the portion of specimen to be observed in the TOT procedure. After the thickness is determined, the oil is readily removed by a short immersion in Freon ® TF fluorocarbon which is agitated ultrasonically.

One of the films between cover slips is used for the TOT procedure; the other for the flow temperature determination. The flow temperature is that temperature at which the edges of the film change contour when the sample is heated in the TOT apparatus at a programmed rate of about 50° C. per minute.

It should be understood that the flow temperature of these (co)polymers or fibers thereof may vary depending on their history. For example, stepwise heating ordinarily raises the flow temperature. This permits heating at temperatures above the initial flow temperature but below the newly attained flow temperature level. The reported flow temperatures are those determined by these procedures.

The sample for the TOT procedure is placed on the heating stage and positioned so that essentially all the light intercepted by the photodetector will pass through the sample. With the sample between crossed (90°) polarizers, and under nitrogen the light intensity and temperature are recorded on the X-Y recorder as the temperature is raised at a programmed rate of about 50° C./min from 25° to 465° C. The sample temperature is obtained from the recorded temperature by use of a suitable calibration curve.

The melt-forming (co)polymers are considered to form anisotropic melts according to the thermo-optical test (TOT) if, as a sample is heated between crossed (90°) polarizers to temperatures above its flow temperature, the intensity of the light transmitted through the resulting anisotropic melt gives a trace on the recorder chart whose height is at least twice the height of the background transmission trace and is at least 0.5 cm greater than the background transmission trace. As these melts form, the value (height) of the light transmission trace (1) is at least twice that of the background transmission and is at least 0.5 cm greater than it, or (2) increases to at least such values. Curve B of the Figure illustrates the type of intensity trace usually obtained for systems forming anisotropic melts.

The intensity of light transmitted through the analyzer when isotropic melts (the sample should be completely melted) are between crossed (90°) polarizers is essentially that of the background transmission (that obtained when the sample, but not the cover slips is outside the field of view with 90° crossed polarizers). As the melt forms, the intensity of the light transmission (1) is essentially that of the background transmission or (2) decreases to such values from a higher value. Curve A of the Figure illustrates an intensity trace of a polymer forming an isotropic melt.

The polyazomethines and copolyazomethines of this invention often exhibit optical anisotropy throughout the temperature range of the molten state, i.e., from the flow temperature to the decomposition temperature of the polymer or the maximum test temperature. However, for some polyzomethines and copolyazomethines portions of the melt may become isotropic when the melt begins to decompose thermally. For still other species, the character of the melt may change completely from anisotropic to isotropic with increasing temperature.

Polymer Melt Temperature (PMT)

The polymer-melt temperature reported in the examples (unless otherwise indicated) is determined on the hot bar, method A described in Preparative Methods of Polymer Chemistry — Sorenson and Campbell — 2nd Ed. Interscience Pub. (1968) (pg. 57–59). The polymer may be in the form of particles, chips, film or fiber for this measurement.

Illustrated in the examples are numerous azomethine homo- and copolymers within the scope of the present invention. These are identified by their structurally-definitive names, e.g., the homopolyazomethine prepared from 2-methyl-1, 4-phenylenediamine and terephthalaldehyde is named as poly(nitrilo-2-methyl-1,4-phenylenenitrilomethylidyne-1,4-phenylenemethylidyne).

EXAMPLE 1

This example illustrates the thermal preparation of poly(nitrilo-2-methyl-1,4-phenylenenitriloethylidyne-1,4-phenyleneethylidyne), which forms an optically anisotropic melt.

In a 12 inch (30.5 cm.) polymer tube are combined 2-methyl-1,4-phenylenediamine (2.44 g, 0.02 mole) and 1,4-diacetylbenzene (3.24 g, 0.02 mole). The reactants are heated at 156° C. for 1 hr, then at 205° C. for 2 hrs, all under a slow nitrogen bleed. The product is collected, broken up, washed separately with water and with methanol in a blender, and dried in a vacuum at 80° C. to yield 4.32 g of polymer, $\eta$ inh = 0.5. The polymer exhibits a PMT of 370° C.

EXAMPLE 2

This example illustrates the preparation of copoly(nitrilo-2-methyl-1,4-phenylenenitrilomethylidyne-1,4-phenylenemethylidyne/nitrilo-1,4-phenyleneoxy-1,4-phenylenenitrilomethylidyne-1,4-phenylenemethylidyne) (90/10, mole basis) using 4-acetamidobenzaldehyde as a terminator.

To a stirred solution of 2-methyl-1,4-phenylenediamine (4.4 g, 0.036 mole) and bis(4-aminophenyl)ether (0.80 g, 0.004 mole) in a mixture of HMPA (25 ml), NMP (25 ml), and lithium chloride (2.0 g) is added 4-acetamidobenzaldehyde (0.4 g). With a few minutes terephthalaldehyde (5.36 g, 0.04 mole) is added. After 16 hr the reaction mixture is unstirrable. The reaction mixture is combined with water; the precipitated polymer collected, washed and dried as in Ex. 1 to yield 9.2 g of product, η inh = 1.1. The copolymer has a PMT of 306° C. and forms an anisotropic melt.

In the following Table I are shown other (co)polymers of the invention, prepared by the general procedure of Ex. 2, above. Dialdehydes used for these syntheses are terephthalaldehyde, methylterephthalaldehyde, 1,2-bis(4-formylphenoxy)ethane, and bis(4-formylphenyl)-ether. Diamines used include 2-fluoro-, 2-chloro-, and 2-methyl-1,4-phenylenediamine, 3,3'-dimethylbenzidine, 4,4'-azoxydianiline, 3,3'-dimethyl-4,4'-diaminoazobenzene, and 1,2-bis(4-aminophenoxy) ethane. In Ex. 7 the reaction solvent is DMAc; a sample of this polymer is heated at 300° C. for 5 min., then pressed at 211 kg/cm² at 325° C. for 20 seconds to produce a flexible film. In preparing the copolymer of Ex. 9, hexamethylenediamine and 2-methyl-1,4-phenylenediamine dihydrochloride are used in equimolar amounts (0.005 mole, each); lithium carbonate (0.01 mole) is used to neutralize the acid generated. In Example 9-1 the reactants are used in 0.002 mole amounts and the reactions solvent is DMAc/NMP (1/1) containing 5% lithium chloride. In Example 9-2 the reactants are used in 0.0005 mole amounts and the solvent is DMAc (1.5 ml) containing 5% lithium chloride; 0.004 g of end cap is used. In Example 9-3, the solvent is DMAc (10 ml) containing 5% lithium chloride and each reactant is used in 0.005 mole amount.

All species shown form anisotropic melts.

TABLE I (Co)Polyazomethine Synthesis: =N—R₁—N=HC—R₂—CH=

| Ex. | R₁ | R₂ | Reaction Time | End Cap | ηinh | PMT° C |
|---|---|---|---|---|---|---|
| 3 | 3,3'-dimethylbiphenyl-4,4'-diyl (two phenyl rings with CH₃ substituents) | 1,4-phenylene | overnight | None | 0.2 | 208 |
| 4 | 2-fluoro-1,4-phenylene (phenyl with F) | 1,4-phenylene | 16 hr. | None | 0.2 | |
| 5 | 2-methyl-1,4-phenylene (phenyl with CH₃) | 1,4-phenylene | 16 hr. | C₆H₅—COCl | 3.4 | 270 |
| 6 | 2-methoxy-1,4-phenylene (phenyl with OCH₃) | 1,4-phenylene | 64 hr. | AA | 0.6 | 280 |
| 7 | 2-chloro-1,4-phenylene (phenyl with Cl) | 1,4-phenylene | 2 days | None | 1.8 | 325 |
| 8 | 2-methyl-1,4-phenylene (phenyl with CH₃) | 4,4'-oxydiphenylene (phenyl—O—phenyl) | overnight | None | 0.4 | 258 |
| 9 | 2-methyl-1,4-phenylene / —(CH₂)₆— (1/1) | 1,4-phenylene | 16 hr. | AA | 0.7 | 150 |
| 9-1 | 3,3'-dimethyl-4,4'-azobiphenylene (phenyl—CH₃ — N=N — phenyl—CH₃) | 1,4-phenylene | overnight | None | 0.46 | 270 |

TABLE I-continued (Co)Polyazomethine Synthesis: =N—R₁—N=HC—R₂—CH=

| Ex. | R₁ | R₂ | Reaction Time | End Cap | ηinh | PMT° C |
|---|---|---|---|---|---|---|
| 9-2 | 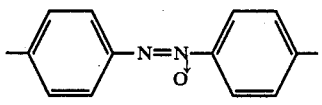 | 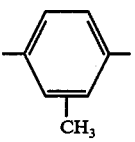 | overnight | AA | 0.48 | 140 |
| 9-3 | 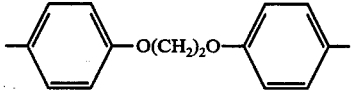 | 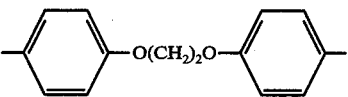 | overnight | None | 0.46* | 270 |

AA — 4-aminoacetanilide
*In methanesulfonic acid

EXAMPLE 10

This example illustrates preparation of copoly (nitrilo-2-methyl-1,4-phenylenenitrilomethylidyne-1,4-phenylenemethylidyne/nitrilo-1,4-phenylenenitrilomethylidyne-1,4-phenylenemethylidyne) (95/5). The copolymer is shaped into a molded bar.

To a stirred solution of 2-methyl-1,4-phenylenediamine (4.64 g, 0.038 mole) and 1,4-phenylenediamine (0.22 g, 0.002 mole) in a mixture of HMPA (20 ml), NMP (20 ml), and lithium chloride (2 g), under nitrogen, is added terephthalaldehyde (5.36 g, 0.04 mole). The reaction mixture is stirred for 16 hr at room temperature, then worked up as in Ex. 2 (oven at 110° C.) to yield 8.6 g of copolymer, ηinh = 4.7, PMT = 260° C. The copolymer melt is optically anisotropic.

A sample of this product is placed in a bar mold and held at 300° C. for 15 min. The bar exhibits a flexural strength of $6.3 \times 10^3$ lb/in², a flexural modulus of $4.3 \times 10^5$ lb/in², and a yield strength of $4.3 \times 10^3$ lb/in² (4.43, 302, and 3.02 kg/mm², respectively.

EXAMPLE 11

This example illustrates the preparation of poly (nitrilo-2-methyl-1,4-phenylenenitrilomethylidyne-1,4-phenylenemethylidyne). The product forms an anisotropic melt and is spun into strong fibers whose tensile properties are enhanced by a relaxed heat treatment.

A solution of 2-methyl-1,4-phenylenediamine (77.9 g, 0.64 mole) in 200 ml of ethanol is prepared at room temperature. A second solution of terephthalaldehyde (81.3 g, 0.61 mole) is prepared in 200 ml of refluxing ethanol. These solutions are simultaneously poured into a 2-liter beaker; polymer precipitation begins in 1-3 minutes. This reaction mixture is permitted to stand overnight at room temperature, under nitrogen. After the ethanol is evaporated, the polymeric residue is washed with 1 liter of water and dried in vacuo at 110° C. for 1.5 hr. The dried residue is polymerized further in a heated screw extruder.

A portion of the extrudate is molded into a plug (η inh = 6.0) and spun into air through a 5-hole spinneret [each hole of 0.007 in (0.018 cm) diameter, spinneret temp. = 260° C., melt zone temperature (MZT) = 255°-262° C.] and wound up at 600 yd/min (548 m/min, bobbin A); another bobbin, bobbin B, is collected at 900 yd/min (822 m/min, MZT = 260° C.). For bobbin "B" fiber, η inh = 7.9. These properties are observed for these as-spun yarns:

| Bobbin Source | T | E | Mi | Den. |
|---|---|---|---|---|
| A | 7.3 | 1.1 | 916 | 20.0 |
| B | 6.4 | 0.92 | 900 | 15.1 |

A sample of the yarn from bobbin "A" is wound on a bobbin wrapped with Fiber-Frax and is heated in an oven (continuously swept with nitrogen) under these successive conditions: Room temp. — 160° C./2 hr, 180° C./2 hr, 200° C./4 hr, 250° C./12 hr. After this treatment, the fiber exhibits these filament properties (average of 15 samples): T/E/Mi/Den.: 28/3.2/939/4.3. One filament exhibits T/E/Mi/Den.: 44/4.2/1118/4.2.

In another treatment a sample of bobbin "A" yarn is separated into single filaments (5) which are suspended vertically from a copper wire and are heated in an oven, continuously swept with nitrogen, under these conditions: room temperature to 165° C./40 min, 165°-230° C./1 hr, 232° C./1.3 hr, 234° C./6.3 hr. After this treatment, the fiber exhibits the following filament properties: T/E/Mi/Den.: 38/4.4/1012/3.7.

EXAMPLE 12

This example illustrates preparation of poly (nitrilo-1,4-phenylenenitrilomethylidyne-2-methyl-1,4-phenylenemethylidyne) which forms an anisotropic melt.

A reaction mixture is prepared by combining with stirring, at room temperature, 2-methylterephthalaldehyde (0.20 g, 0.00135 mole), 1,4-phenylenediamine (0.146 g, 0.00135 mole) and 3 ml of an anhydrous mixture of HMPA/NMP (50/50 by volume) containing 5% lithium chloride; after 15 min, 4-acetamidobenzaldehyde (0.004 g) is added. The reaction mixture is stirred overnight at room temperature under anhydrous conditions, then combined with water to precipitate the polymer which is collected, washed separately with water and ethanol (absolute), and dried in vacuo at 80° C. There is obtained about 0.2 g polymer, η inh = 0.7, PMT = 270° C. Fibers pulled from the melt at 270° C. exhibit these filament tensile properties: T/E/Mi/Den.: 3.5/0.55/684/6.1.

2-Methylterephthalaldehyde may be prepared by oxidizing 2-methyl-α,α'-1,4-xylenediol [m.p. 78°-81° C.; prepared by reducing 2-methylterephthaloyl chloride with lithium aluminum hydride by the general procedure shown by Nystrom and Brown, J. Am. Chem. Soc., 69, 1197 (1947)] with aqueous 1 N ceric ammonium nitrate, $(NH_4)_2Ce(NO_3)_6$, using the general procedure of Trahanovsky et al., J. Org. Chem., 32, 3865 (1967). After being heated and stirred for 30 min, the aqueous reaction mixture is extracted with ether (2×) and methylene chloride (1×). The combined organic layers are washed with aqueous sodium bicarbonate and with water, then dried over magnesium sulfate. The latter is filtered off and the filtrate evaporated to a soft white solid, which is sublimed at 65° C. to yield a white powder, m.p. = 70°–71° C. The powder is recrystallized from water to give 2-methylterephthalaldehyde, m.p. = 71°–72° C.

EXAMPLE 13

This example illustrates preparation of poly (nitrilo-2-chloro-1,4-phenylenenitrilomethylidyne-1,4-phenylenemethylidyne) and a strong fiber thereof. The melt of the polymer is optically anisotropic.

To a stirred solution (paddle stirrer) of 2-chloro-1,4-phenylenediamine (8.58 g, 0.06 mole) in a mixture of HMPA (30 ml), NMP (30 ml), and lithium chloride (3.0 g) in a tubular flask, swept with nitrogen, is added 4-acetamidobenzaldehyde (0.4 g). Within a few minutes, terephthalaldehyde (8.04 g, 0.06 mole) is added. The reaction mixture is stirred at room temperature and becomes unstirrable after about 16 hr. The reaction mixture is worked up as in Ex. 2 to yield 13.8 g of polymer, $\eta$ inh = 0.7, PMT = 310° C.

A plug of this polymer is melt spun into air through a 1-hole spinneret [hole diameter = 0.009 in (0.023 cm), spinneret temperature = 320° C., melt zone temperature = 310° C., pack contains screens] and the resulting fiber wound up at 150 yd/min. (137.2 m/min). The as-spun fiber ($\eta$ inh = 4.5) exhibits these filament properties: T/E/Mi/Den.: 7.4/1.3/683/10.9; O.A. = 22°. A sample of the fiber is heat treated in an oven on a bobbin wrapped with Fiber-Frax as follows: from room temperature to 150° C. in 30 min, at 150° C. for 30 min., from 150° C. to 260° C. in 30 min., then at 260° C. for 3.5 hrs. After being removed from the oven and allowed to cool to room temperature, the fiber exhibits these filaments tensile properties: T/E/Mi/Den.: 15.3/1.9/844/11.1; O.A. = 10°.

In the following Table II-A and II-B are shown (co)polyazomethines and fibers spun from anisotropic melts thereof. The polymers of Examples 14–19 are prepared by the general procedures of Ex. 2, spinning is done by the general procedures of Ex. 11–13. Dialdehydes used include 4,4'-diformylbiphenyl, 2-chloroterephthalaldehyde, terephthalaldehyde, and isophthalaldehyde. Diamines used include 1,4-phenylenediamine; 2-methyl-1,4-phenylenediamine; and 4,4'-ethylenedianiline. Copolymers are shown in Ex. 16, 19 and 19-2 (two diamines) and 18 and 19-3 (two aldehydes). The as-spun fibers were heat treated as indicated in Table II-B to give higher tenacity and elongation.

For the polymer of Ex. 19-1 the reactants 1,4-bis(3-methyl-4-aminophenoxy)-n-butane and terephthalaldehyde are refluxed in benzene with phenyl-α-napthylamine as antioxidant. After the benzene-water azeotrope is collected, the precipitated polymer is filtered from the remaining benzene, then washed and dried.

For the polymer of Ex. 19-2 the general procedure of Ex. 19-1 is used with terephthalaldehyde, methyl-1,4-phenylenediamine, and 1,12-bis(3-methyl-4-aminophenoxy)-n-dodecane as reactants. For the polymer of Ex. 19-3, the general procedure of Example 19-1 is followed using terephthalaldehyde, 4,4'-diformylbiphenyl, methyl-1,4-phenylenediamine, and 4-aminoacetanilide (end cap) as reactants with methylene chloride as solvent.

The 1,4-bis(3-methyl-4-aminophenoxy)-n-butane used in Ex. 19-1 is prepared by causing equimolar quantities of 3-methyl-4-nitrophenol and 1,4-dibromobutane to react in the presence of anhydrous potassium carbonate in acetone. After 48 hours at reflux, the solvent is removed and the solid product worked up and recrystallized from 2-B alcohol to yield tan needles of 1,4-bis(3-methyl-4-nitrophenoxy)-n-butane, m.p. = 126.5°–127.5° C. This nitro compound is reduced to the desired diamino analog with hydrogen at 1000–15000 lb/in$^2$ at 70° C. or higher, using a Raney nickel catalyst, with methanol as solvent. The catalyst is separated from the solution, the solvent evaporated, and the desired diamine recrystallized from ethanol (charcoal); m.p. = 108°–110° C. In a similar manner, the 1,12-bis(3-methyl-4-aminophenoxy)-n-dodecane (m.p. = 93°–94° C.) used in Ex. 19-2 is prepared from 1,12-dibromododecane.

TABLE II-A
(Co)polyazomethines and Fibers: =N—R₁—N=HC—R₂—CH=
| Ex. | R₁ | R₂ | Reaction Time | End Cap | η inh | PMT° C | Flow Temp° C | Anisotropy Range° C | Spinneret temp.° C | WUS m./min. |
|---|---|---|---|---|---|---|---|---|---|---|
| 14* | 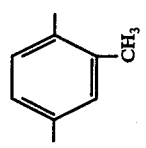 | 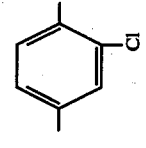 | 16 hr | AMB | 0.5 | 260 | | >260 | 282–290 | 6.1 |
| 15 | 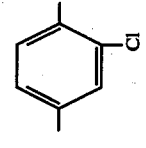 | 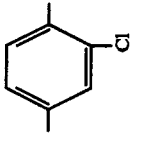 | 16 hr. | AA | 0.3 | 336 | 334 | >334 | | |
| 16 | 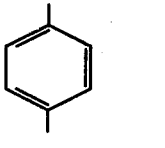 | 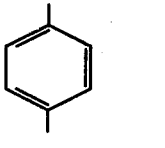 | 16 hr. | AA | 2.9 | 260 | 249 | >249 | 262 | 457 |
| 17 | 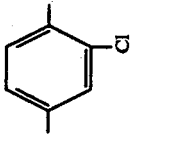 | 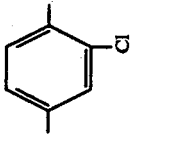 | 4 hr. | AA | 0.70 | 260 | 256 | >256 | 310 | 91.4 |
| 18 | 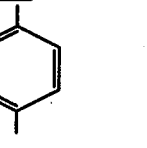 | 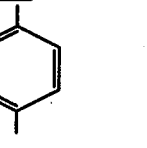 | 16 hr. | AA | 1.5 | 260 | 246 | >242 | 262 | 30.5 |
| 19 | 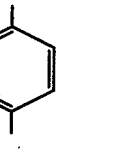 | 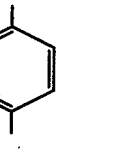 | 16 hrs. | AA | 1.4 | 210 | 223 | >220 | 230 | 786 |

TABLE II-A-continued (Co)polyazomethines and Fibers: =N—R$_1$—N=HC—R$_2$—CH=

| Ex. | R$_1$ | R$_2$ | Reaction Time | End Cap | η inh | PMT° C | Flow Temp° C | Anisotrophy Range° C | Spinneret temp. ° C | WUS m./min. |
|---|---|---|---|---|---|---|---|---|---|---|
| 19-1 | 3-CH$_3$-4-(O(CH$_2$)$_4$O-)phenyl | 1,4-phenylene | 6 hrs. | None | 0.46** | 220 | 230 | >230 | 300 | 152 |
| 19-2 | bis[3-CH$_3$-4-(O(CH$_2$)$_{12}$O-)phenyl]methane (80/20) | 1,4-phenylene | 6 hrs. | None | 0.49 | 220 | — | — | 288 | 549 |
| 19-3 | 2,5-dimethyl-phenyl | 4,4'-biphenylene / 1,4-phenylene (80/20) | 6 hrs. | AA | 1.1*** | 190 | 220 | >225 | 270 | 549 |

AMB = 4-Amino-3-methylbenzoic acid
AA = 4-Aminoacetanilide
*As-spun properties T/E/Mi/Den. = 5.4/1.2/481/104
**CH$_3$SO$_3$H
***(0.1% concentration)

TABLE II-B
Heat Treatment of (Co)polyazomethine Fibers

| Fiber Source, Table II-A Example | As-Spun Properties T | E | Mi | Den | Heat Treatment Conditions | Heat Treated Properties T | E | Mi |
|---|---|---|---|---|---|---|---|---|
| 16 | 6.7 | 1.4 | 538 | 33 | 200° C/7 hr. | 12.7 | 2.2 | 625 |
| 17* | 7.6 | 2.7 | 440 | 28 | 260° C/4 hr. | 16.6 | 3.1 | 464 |
| 18 | 4.9 | 2.1 | 370 | 58 | 210° C/7 hr. | 7.5 | 2.6 | 329 |
| 19 | 6.1 | 1.2 | 676 | 6.3 | 200° C/7 hr. | 18.3 | 2.8 | 740 |
| 19-1 | 4.8 | 3.7 | 229 | 7.5 | 220°–240° C/7 hr. | 9.9 | 5.0 | 246 |
| 19-2 | 3.3 | 3.1 | 282 | 6.7 | 155° C/1 hr., 190° C/1 hr., 225° C/5 hr. | 9.8 | 4.2 | 287 |
| 19-3 | 5.8 | 0.9 | 729 | 7.6 | 115° C/16.5 hr., 150° C/2 hr., 175° C/3 hr., 200° C/3 hr. | 14.8 | 3.4 | 508 |

*As-spun O.A. = 22°

EXAMPLE 20

This example illustrates preparation of copolyazomethines from 2-chloroterephthalaldehyde and pairs of diamines selected from the group 4,4'-ethylenedianiline; 1,4-phenylenediamine; bis(4-aminophenyl)ether; and 1,4-cyclohexanediamine. Melts of these copolymers are optically anisotropic.

To a solution of 4,4'-ethylenedianiline (2.12 g, 0.01 mole) and 1,4-phenylenediamine (1.08 g, 0.01 mole) in a mixture of HMPA (10 ml), NMP (10 ml), and lithium chloride (0.5 g) is added 2-chloroterephthalaldehyde (3.36 g; 0.02 mole), all under nitrogen. After 15 min, 4-aminoacetanilide (0.12 g) is added. The reaction mixture is stirred overnight at room temperature and worked up as in Ex. 1 (dried at 70°–75° C.) to yield 5.3 g of copoly)nitrilo-1,4-phenyleneethylene-1,4-phenylenenitrilomethylidyne-2-chloro-1,4-phenylenemethylidyne/nitrilo-1,4-phenylenenitrilomethylidyne-2-chloro-1,4-phenylenemethylidyne) (50/50), η inch = 0.5, PMT = 150° C.

In the following Table III are shown other copolymer compositions prepared by the procedure above, using pairs of the above-named diamines to give copolymers with the indicated repeating units. These are optically anisotropic in the melt.

tensile properties after exposure to vaporized morpholine.

To a stirred solution ("egg beater" stirrer) of 2-methyl-1,4-phenylenediamine (12.2 g, 0.01 mole) in a mixture of HMPA (60 ml), NMP (60 ml), and lithium chloride (5.0 g) in a 500 ml resin kettle, under nitrogen, is added terephthalaldehyde (13.4 g, 0.1 mole). After 30 min, 4-aminoacetanilide (0.30 g) is added; stirring is maintained for a total of 16 hr. The reaction mixture is worked up as in Ex. 1 to yield 21.6 of polymer, ηinh = 3.0, PMT = 256° C. The polymer melt is optically anisotropic.

A plug of the polymer is melt spun, spinneret temperature = 250° C., melt zone temperature = 240° C., windup speed = about 500 yd/min (457 m/min).

The as-spun fiber (η inh = 3.3) exhibits these filament tensile properties: T/E/Mi/Den. = 9/1.6/789/6.4

A small sample of fiber (0.5g) and 0.03 ml of morpholine are heated with a sealed tube for 2 hr. at 133° C. (vapor bath). The fiber is removed, then allowed to stand in air for 1 hour. For this treated fiber, T/E/Mi/Den. = 8.2/1.1/736/7.4.

An as-spun fiber sample is heat treated under these conditions: room temperature to 160° C./1 hr, then at 200° C./3 hr. The treated fiber exhibits these filament properties: T/E/Mi/Den. = 16/2.2/867/7.2.

TABLE III

Copolymer Units =

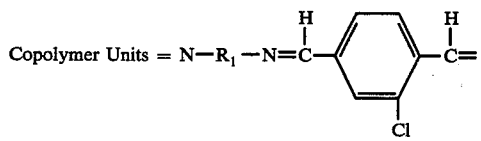

| Item | R₁ | | η inh | PMT° C |
|---|---|---|---|---|
| 1* | (—⌬—CH₂CH₂—⌬—∣—⌬—O—⌬—) 30/70 | | 0.4 | 290 |
| 2 | (—⌬—CH₂CH₂—⌬—∣—⌬(S)—) 50/50 | | 0.6 | 272 |

*As-spun T/E/Mi/Den/O.A. = 2.9/4.1/114/16/17°
Heat treated T/E/Mi/Den = 9.3/7.1/163/16

EXAMPLE 21

This example illustrates that fibers of poly(nitrilo-2-methyl-1,4-phenylenenitrilomethylidyne-1,4-phenylenemethylidyne) exhibit excellent retention of

EXAMPLE 22

This example illustrates that fibers of this invention exhibit good retention of strength when subjected to (1) heat ageing in rubber stock having high amine content, and to (2) basic hydrolysis.

PART A

A sample of yarn of another preparation of the copolymer of Ex. 10 is heat treated under these successive conditions: 150° C./40 min, 180° C./1 hr, and 200° C./4 hr (initial oven temperature is 150° C.) to produce a fiber with these filament properties: T/E/Mi/Den.: 9.9/1.4/788/7.3. A sample of this heat treated yarn is skeined and heated at 154° C./24 hr in an air atmosphere to yield a fiber with these yarn properties: T/E/Mi/Den = 6.9/0.9/779/120. This treated fiber is plied to a 1,000 denier cord and a composite prepared by imbedding the cord in rubber stock having a high content of amine. The composite is heat aged at 154° C. for 24 hr. The rubber is then swollen by toluene and the fiber (cord) removed. For this cord, T/E/Mi = 2.2/0.80/472 (10 inch breaks). This is 32% retention of tenacity under severe test conditions.

PART B

A sample of yarn (4 filaments) of another preparation of the polymer of Ex. 10 is heat treated for 2 hr/190° C. and 4 hr/200° C. (oven initially at 190° C.) to yield fibers with these filament properties: Te/E/Mi/Den. = 12.5/2.5/560/30.1

Samples of these fibers are subjected to hydrolysis studies as follows:
- Test B-1: Fibers of 8 inch length are sewn in line in cheese cloth and heated in water for 2 hr/95° C.
- Test B-2: This is equivalent to B-1 except that 1N aqueous sodium hydroxide replaces the water.

After the test the fibers and cloth are soaked in water until free of alkali.

These filament tensile properties are determined for the washed and dried fibers after the hydrolysis treatments.

Fiber from Test B-1: T/E/Mi/Den.: 8.1/1.8/512/34.7
Fiber from Test B-2: T/E/Mi/Den.: 12.5/2.0/717/23.3.

EXAMPLE 23

This example shows that copolyazomethine fibers of this invention exhibit good retention of strength when subjected to heat ageing in rubber.

Another sample of the copolymer of Ex. 16 is prepared, η inh = 1.2. A plug is spun (spinneret temperature = 250°–252° C.) and several bobbins of fiber wound up within the range of 288–1,271 m/min. For a bobbin collected at 1,271 m/min, filament T/E/Mi/Den. = 6.4/1.1/717/4.3

Thirty of these filaments are plied together (3 turns/inch) into a yarn which is heat treated for 7 hr at 230° C. The treated yarn exhibits these properties: T/E/Mi/Den. = 11.4/1.3/906/120.5. This yarn (with 3 turns/inch twist) is then treated in rubber and retested, all as shown below.

A yarn sample (about 20 inches long) is placed lengthwise between two pads of rubber, each about 4 inches long. The rubber pads, with the yarn between them, are clamped together tightly and the protruding yarn ends are taped to retain the twist. The test specimen is heated in air for 24 hr at 165° C., then allowed to cool to room temperature, after which the yarn ends are clamped in an Instron tester and the breaking strength of the embedded yarn is determined.

Separate rubber stocks of high and low amine content are used.

These results are obtained:

| Rubber Stock | Maximum Breaking Load | |
|---|---|---|
| | lb. | g/d |
| High amine content | 2.83 | 10.7 |
| Low amine content | 2.61 | 9.8 |

These values represent 94% and 86%, respectively, retention of tenacity.

EXAMPLE 24

This example illustrates melt preparation of a random copolymer containing nitrilo-2-methyl-1,4-phenylenenitrilo, methylidyne-1,4-phenylenemethylidyne, and nitrilo-1,4-phenylenemethylidyne units in the ratio of 4:4:1.

In a 3-neck, 250 ml round bottom flask equipped with a stirrer, nitrogen bleed tube, and a distillation head are combined 2-methyl-1,4-phenylenediamine (7.32 g, 0.06 mole), 4-aminobenzaldehyde "oligomer" (1.58 g, 0.015 mole, η inh = 0.08, product of K and K Laboratories, Plainview, N.Y.), and N,N'-(1,4-phenylenemethylidyne) dianiline (17.88 g, 0.06 mole). The combined ingredients are stirred and heated at 250° C. for 30 min, under nitrogen. Then, heating at 250° C. under a reduced pressure of 5 mm Hg is carried out for 10 min, after which the reaction mixture (anisotropic melt) is allowed to cool to room temperature. During heating the polymerization by-products of water and aniline are distilled out and collected. The resulting solid copolymer is collected, broken up in a blender and washed therein with acetone, and dried in vacuo at 80° C. There is obtained 13.3 g of copolymer, ηinh = 3.2, PMT = 210° C. It forms an anisotropic melt.

A plug of the copolymer is melt spun into air through a 1-hole spinneret [hole diameter = 0.009 in. (0.023 cm), spinneret temperature = 230° C., melt zone temperature = 225° C.)] and the resulting fiber wound up at 500 yd/min (457.2 m/min). The as-spun fiber exhibits these filament properties: T/E/Mi/Den.: 3.7/0.7/556/7.2. A portion of this fiber is wrapped on a Fiber-Frax bobbin and heated in an oven, under nitrogen, for 6 hr at 240° C. The treated filament exhibits these properties: T/E/Mi/Den.: 10.3/1.7/659/7.2.

PART B

A copolymer containing nitrilo-2-methyl-1,4-phenylenenitrilo, methylidyne-2-chloro-1,4-phenylenemethylidyne, and nitrilo-1,4-phenylenemethylidyne units (ratio is 2:2:1) is prepared; the copolymer forms an anisotropic melt. The procedure of Part A, above, is repeated but with use of 4.88 g (0.04 mole) diamine, 2.12 g (0.02 mole) "oligomer," and 12.74 g (0.04 mole) of N,N'-(2-chloro-1,4-phenylenemethylidyne)dianiline, and with a 20 min atmospheric pressure heating period of 250° C., followed by a 20 min, 10 mm Hg pressure heating period of 250° C. There is obtained 11.7 g of copolymer, η inh = 1.5, PMT = 230° C. It forms an anisotropic melt.

EXAMPLE 25

This example illustrates preparation of poly(nitrilo-2-methyl-1,4-phenylenenitrilomethylidyne-2,6-naphthylenemethylidyne).

In a reaction vessel fitted with a stirrer and a distillation head are combined 2-methyl-1,4-phenylenediamine (1.22 g, 0.01 mole) and N,N'-(2,6-naphthylenedimethylidyne)dianiline (3.3 g, 0.01 mole). These reactants are melted and stirred at 250° C. for 20 min. The aniline by-product distills off and is collected. The reaction product is cooled, collected, washed with acetone, and dried to yield 3.22 g of polymer, PMT = 245° C., η inh = 0.6. It forms an anisotropic melt.

The N,N'-(2,6-naphthylenedimethylidyne)dianiline is prepared by first reducing 2,6-naphthalene dicarbonyl chloride (50.6 g, 0.02 mole) in ethylene glycol dimethylether (150 ml) with lithium tri-tert.-butoxyaluminum hydride (103 g) in ethylene glycol dimethylether (700ml). The stirred diacid chloride is at −70° C., under nitrogen; the reducing agent is added dropwise over 4 hr., after which the combined ingredients are stirred overnight and allowed to warm to room temperature. The reaction mixture is poured onto ice to precipitate a white product which is collected and extracted (while still damp) with hot (boiling) 2B alcohol. The hot alcohol and the residual solid are separated, and the alcohol extractant distilled to leave crude, yellow, crystalline 2,6-naphthylenedialdehyde, m.p. = 162°–190° C.; (some unmelted material remains). Then, the crude dialdehyde (4.0 g) is dissolved in ethanol (200 ml), with stirring. To this solution is added aniline (6 ml). The reactants are refluxed together for 8 hr, then are cooled to deposit a yellow precipitate of the cited dianiline which is collected, washed, and dried, m.p. = 180°–182° C.

Illustrated in the following Table IV (Ex. 26–38) are other anisotropic melt-forming (co)polyazomethines of this invention, prepared by the solution polymerization processes described herein (i.e., using HMPA, NMP, lithium chloride, "AA" terminator); fibers and a film are shown for some species. Diamine reactants used include 2-methyl-1,4-phenylenediamine; 1,4-diacetylbenzene bishydrazone; 2,6-dichloro-1,4-phenylenediamine; 1,2-bis(4-aminophenyl)ethane; bis(4-aminophenyl)methane; bis(4-aminophenyl)thioether; 1,5-diaminonaphthaline; 2-chloro-1,4-phenylenediamine; hexamethylenediamine; and 4-aminobenzoylhydrazide. Dialdehyde reactants used include 2-chloroterephthalaldehyde; 1,2-bis(4-formylphenyl)ethane; 2,5-dichloroterephthalaldehyde; terephthaladehyde; 1,2-bis(4-formylphenoxy)ethane; 2,5-dichloroterephthalaldehyde; terephthalaldehyde; 1,2-bis (4-formylphenoxy)ethane; 4,4'-dibenzaldehyde; and isophthalaldehyde.

A bishydrazone was used in Ex. 26. It may be prepared by refluxing (48 hr) 1,4-diacetylbenzene with excess hydrazine hydrate in 2B alcohol, then cooling the reaction mixture to yield the product, m.p. = 184° C. (dec.). The dialdehyde used in Ex. 35 is prepared by first reducing the dimethyl ester of 1,2-bis(4-carboxyphenoxy)ethane with lithium aluminum hydride in tetrahydrofuran to form 1,2-bis(4-hydroxymethylphenoxy)ethane; m.p. = 174°–176° C. The latter is oxidized to the desired dialdehyde with ceric ammonium nitrate in glacial acetic acid/water following the general procedure described in J. Org. Chem. 32, 3865–8 (1967); m.p. = 112.5°–114° C.

The dialdehyde used in Ex. 36 is prepared by reducing the dimethyl ester of 4,4'-bibenzoic acid with lithium aluminum hydride in tetrahydrofuran at about 5° C. to 4,4'-bibenzyl alcohol; m.p. = 190°–192° C. The alcohol is oxidized to the desired dialdehyde with ceric ammonium nitrate in glacial acetic acid/water, following the general procedure described in J. Org. Chem., 32, 3865–8 (1967). For the dialdehyde, m.p. = 141°–143° C. All deniers shown are filament values. Fibers are melt spun through a 1-hole spinneret [hole diameter = 0.009 in (0.023 cm)]

TABLE IV (Co)polyazomethines: = N—R$_1$—N=C—R$_2$—C=*
                                              |        |
                                              Z$_1$    Z$_1$

| Ex. | R$_1$ | R$_2$ | η inh | PMT° C |
|---|---|---|---|---|
| 26 | CH$_3$-phenyl-, bond, (1/2) | phenyl-, Cl-phenyl- (1/2) | 0.5 | 206 |
| 27 | CH$_3$-phenyl- | phenyl-(CH$_2$)$_2$-phenyl- | 1.9 | 175 |
| 28 | Cl,Cl-phenyl- | Cl-phenyl- | 0.4 | 250 |

TABLE IV-continued
| Ex. | R₁ | R₂ | η inh | PMT° C |
|---|---|---|---|---|
| 29 | 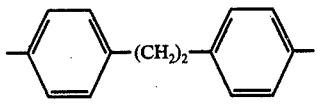 | 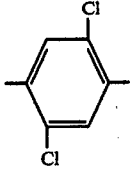 | 0.2 | 340 |
| 30 | 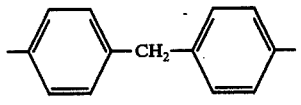 | 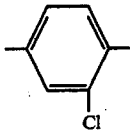 | 0.3 | 270 |
| 31 | 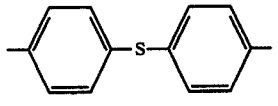 | 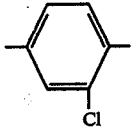 | 0.2 | 268 |
| 32 | 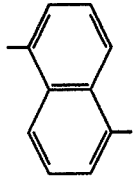 | 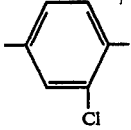 | 0.2 | 340 |
| 33 | 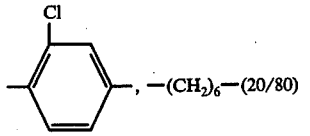 | 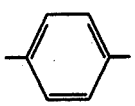 | 0.2 | 340 |
| 34 | 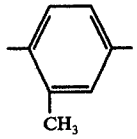 | 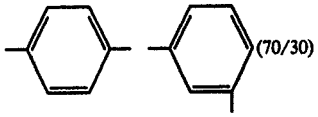 | 0.5 | 205 |
*$Z_1$ and $Z_2$ are hydrogen except for Ex. 26 where $Z_1$ and $Z_2$ are methyl when $R_2$ is phenylene.
| Ex. | R₁ | R₂ | η inh | PMT° C | As-Spun Fibers T | E | Mi | Den | O.A. |
|---|---|---|---|---|---|---|---|---|---|
| 35 | 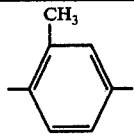 | 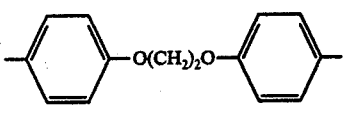 | 0.5 | 228 | 2.5 | 0.96 | 321 | 30 | 19° |
| 36* | 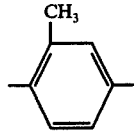 | 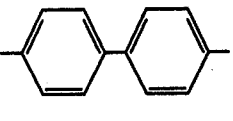 | 1.1 | 245 | 4.4 | 0.97 | 489 | 39.3 | 22° |
| 37 | 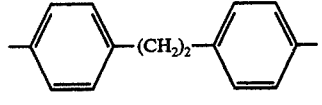 | 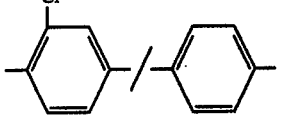 (70/30) | 1.7 | 270 | 3.4 | 1.2 | 353 | 4.7 | — |
| 38** | 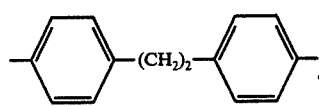 | 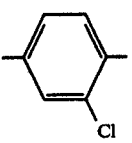 | 0.4 | | 4.0 | 1.4 | 424 | 6.5 | — |

TABLE IV-continued

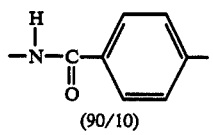
(90/10)

*For a heat treated fiber (oven, N₂ atmosphere, Fiber-Frax® covered bobbin, 235° C/3 hr), filament T/E/Mi/Den. = 6.6/1.4/517/37.
**Heat treated T/E/Mi/Den. = 15/3.7/455/4.

EXAMPLE 39

This example provides further illustration that the tensile properties of the fibers of this invention are significantly enhanced by the heat treating processes employed. Demonstration is provided that exposure times may be brief or that exposure temperatures may be low in these processes.

PART A

As-spun copolyazomethine filaments of Ex. 37 (T/E/Mi/Den. = 3.4/1.2/353/4.7) are plied into yarn (5 filaments) which is passed through a bed of talc, then wound on a Fiber-Frax ®-covered metal bobbin. The sample is placed in a nitrogen-swept oven whose temperature is then raised in 40 min. from room temperature to 150° C. and maintained thereat for 20 min. The sample is cooled to about 50° C. in the oven, then removed and cooled to room temperature. The treated fiber exhibits these filament properties: T/E/Mi/Den.: 9.2/2.0/439/5.7. A portion of this treated fiber is wound on a bobbin and again heated in the oven (under nitrogen) from room temperature to 260° C. over 40 min.; the sample is kept at 260° C. for 3 hr. 20 min. before being cooled and removed via the above-described conditions. This treated fiber now exhibits these filament properties: T/E/Mi/Den. = 20.0/3.8/470/5.5

In the following Parts B and C fibers of (co)-polyazomethines comprising the repeating structural unit

=N—R₁—N=HC—R₂—CH= are employed. In Part B the polymer corresponds to that prepared in Ex. 17, but is prepared by the general melt polymerization procedure of Ex. 24. In Part C the polymers are prepared as for Part B, and by solution polymerization; the copolymer and fiber used are those of Ex. 37. Spinning is done as described herein.

PART B

In this treatment as-spun polyazomethine fibers are suspended for 20 sec., under a nitrogen atmosphere, at the indicated temperature. This brief treatment time produces significant enhancement of tensile properties.

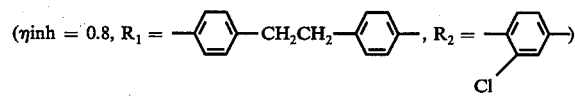

Polymer
($\eta$inh = 0.8, $R_1$ = —⟨⟩—CH₂CH₂—⟨⟩—, $R_2$ = —⟨⟩—)
                                                         Cl (as spun fiber T/E/Mi/Den = 4.4/1.4/402/7.3)

| Bath Temperature ° C. | Heat Treated Fiber | | | |
|---|---|---|---|---|
| | T | E | Mi | Den. |
| 156 | 8.8 | 1.7 | 587 | 10.2 |
| 179 | 10.0 | 1.6 | 691 | 7.2 |
| 197 | 8.1 | 1.4 | 624 | 8.6 |
| 245 | 8.0 | 1.6 | 555 | 7.0 |

PART C

In this treatment as-spun (co)polyazomethine fibers are wound on Fiber-Frax ®-covered metal bobbins and heated in an oven (nitrogen atmosphere) for 2 hr. at the temperatures shown below. Significant improvements in fiber tensile properties are achieved at the treatment temperature employed, as shown in Table V.

TABLE V

| Polymer | As-Spun Fibers T/E/Mi/Den | Heat Treated Fibers Treatment Temperature//T/E/Mi/Den | | | |
|---|---|---|---|---|---|
| | | 100° C | 125° C | 150° C | 200° C |
| 1 | 3.6/1.3/400/7.0 | 4.7/0.9/531/9.7 | 6.7/1.1/595/8.8 | 8.4/1.5/636/9.6 | 8.9/1.4/641/8.1 |
| 2 | 3.4/1.2/353/4.7 | 6.9/1.4/511/4.9 | 8.0/1.6/489/5.6 | 12.8/2.4/503/5.4 | 12.8/2.7/452/6.0 |
| 3 | 4.4/1.4/402/7.3 | 8.5/1.6/581/7.1 | 7.3/1.6/469/9.4 | 9.3/1.8/551/7.8 | 10.0/1.8/577/7.1 |
| 4 | 4.8/0.8/765/6.1 | 3.6/0.6/681/6.4 | 6.2/1.0/681/6.6 | 6.8/1.0/716/6.0 | 12.7/1.8/811/6.4 |

| Legend Polymer | $R_1$ | $R_2$ | $\eta$ inh |
|---|---|---|---|
| 1 | —⟨⟩—(CH₂)₂—⟨⟩— | —⟨⟩— (Cl) | 0.4 |
| 2 | —⟨⟩—(CH₂)₂—⟨⟩— | —⟨⟩—\|—⟨⟩— (Cl) (70/30) | 1.7 |
| 3 | —⟨⟩—(CH₂)₂—⟨⟩— | —⟨⟩— (Cl) | 0.8 |

TABLE V-continued

| 4 | 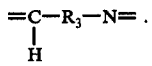 CH₃ | 3.8 |
|---|---|---|

EXAMPLE 40

Shown in the following Table VI are anisotropic melt-forming (co)polyazomethines whose repeating structural unit(s) correspond to the formula $$=C-R_3-N=$$
$$\phantom{=C-}|$$
$$\phantom{=C-}H$$

The (co)polymers are prepared by melt polymerization of reactants selected from the group of 4-aminobenzaldehyde, 2-methyl-4-aminobenzaldehyde, and 3-methyl-4-aminobenzaldehyde, all freshly synthesized. In a typical synthesis for items 1–4, an appropriate monomer(s) (about 0.02 mole each) is combined with aniline(1 ml.) in a reaction vessel fitted with a stirrer, distillation head, and nitrogen bleed. The stirred reactants are heated, under nitrogen, for 0.5 hr. in an oil bath maintained at 250° C. Then, the nitrogen flow is halted and the reactants heated and stirred at 250° C. for 0.5 hr. under a pressure of less than 1.0 mm. Hg. The reaction mixture is cooled, the product collected, washed with acetone, and dried.

For the copolymer of item 5, 0.096 mole amounts of each aminobenzaldehyde and 0.0057 mole of methyl-1,4-phenylenediamine(used as viscosity stabilizer) are combined with xylene (350 ml) and trifluoroacetic acid (0.25 ml). The reaction mixture is refluxed 3 hr. (benzene-water azeotrope removed), cooled, and the copolymer filtered off, washed with acetone and dried in vacuo. A copolymer plug is spun as in Ex. 13 (spinneret temperature = 240° C., melt zone temperature = 232° C.) and the fiber wound up at 155 m/min. For the as-spun fiber, T/E/Mi = 3.6/0.8/638. Fiber samples are treated with talc, then heated in an oven at 222° C. for 163 hrs (N₂); samples are 6-inch (15.2 cm) lengths supported on a screen. For the heat treated fibers, T/E/Mi = 10.8/1.9/709.

TABLE VI (Co)polyazomethines, $=C(H)-R_3-N=$

| Item | R₃ | η inh | PMT° C |
|---|---|---|---|
| 1 | 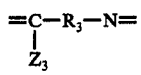 (1/1) CH₃ | 1.0 | 210 |
| 2 | ⟨⟩—|—⟨⟩— (1/1) CH₃ | 0.4 | 200 |
| 3 | ⟨⟩—|—⟨⟩— (1/1) CH₃  CH₃ | 0.4 | 178 |
| 4 | 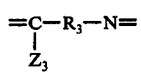 CH₃ | 0.3 | 310 |

TABLE VI-continued (Co)polyazomethines, $=C(H)-R_3-N=$

| Item | R₃ | η inh | PMT° C |
|---|---|---|---|
| 5* | 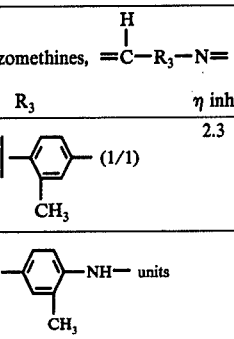 (1/1) CH₃  CH₃ | 2.3 | 214 |

*contains 2.88 mole % —HN—⟨⟩—NH— units
                              |
                              CH₃

I claim:

1. A (co)polyazomethine fiber consisting essentially of the following recurring structural unit $$=C-R_3-N=$$
$$\phantom{=C-}|$$
$$\phantom{=C-}Z_3$$

wherein $Z_3$ is selected from the group of a hydrogen atom or a methyl or ethyl radical and $R_3$ is selected from the group consisting of 1) single and fused 6-membered carbocyclic ring systems in which one of the ring carbons of an aromatic ring, if present, may be replaced by nitrogen and wherein the chain extending bonds of the ring system, if attached to a single ring, are positioned 1,4- to each other, and if attached to different rings, are in positions parallel and oppositely directed, and 2) multiple ring systems in which the individual rings are joined by a chemical bond or a bridging unit not exceeding fourteen atoms in length and in which the chain extending bonds of each ring are in the 1,4-positions.

2. A fiber according to claim 1 wherein at least 25% of the ring systems in recurring units are ring-substituted with a member of the group consisting of chloro- and methyl- radicals.

3. A (co)polyazomethine that is melt-spinnable into fibers and has a polymer melt temperature below 375° C., an inherent viscosity of at least 0.2 and which displays optical anisotropy in the molten state and which consists essentially of the following recurring structural unit $$=C-R_3-N=$$
$$\phantom{=C-}|$$
$$\phantom{=C-}Z_3$$

wherein $Z_3$ is selected from the group of a hydrogen atom or a methyl or ethyl radical and $R_3$ is selected from the group consisting of 1) single and fused 6-membered carbocyclic ring systems in which one of the ring carbons of an aromatic ring, if present, may be replaced by nitrogen and wherein the chain extending bonds of the ring system, if attached to a single ring, are positioned 1,4- to each other, and if attached to different rings, are in positions parallel and oppositely directed, and 2) multiple ring systems in which the individual rings are joined by a chemical bond or a bridging unit not exceeding fourteen atoms in length and in which the chain extending bonds of each ring are in the 1,4-positions.

4. A (co)polyazomethine according to claim 3 wherein $Z_3$ is hydrogen.

* * * * *